United States Patent
Beichl et al.

(10) Patent No.: US 7,165,771 B2
(45) Date of Patent: Jan. 23, 2007

(54) BRUSH SEAL AND METHOD OF USING AND MAKING SAME

(75) Inventors: Stefan Beichl, Herrsching (DE); Carsten Butz, München (DE); Christoph Cernay, Bruckmühl (DE); Alfons Gail, Friedberg (DE); Adriano Marchini, Garching (DE); Alexander Rauschmeier, München (DE)

(73) Assignee: MTU Aero Engines GmbH, Munich (DE)

( * ) Notice: Subject to any disclaimer, the term of this patent is extended or adjusted under 35 U.S.C. 154(b) by 14 days.

(21) Appl. No.: 10/499,913

(22) PCT Filed: Dec. 14, 2002

(86) PCT No.: PCT/DE02/04592

§ 371 (c)(1),
(2), (4) Date: Feb. 7, 2005

(87) PCT Pub. No.: WO03/056216

PCT Pub. Date: Jul. 10, 2003

(65) Prior Publication Data

US 2005/0116423 A1 Jun. 2, 2005

(30) Foreign Application Priority Data

Dec. 22, 2001 (DE) .............................. 101 63 804

(51) Int. Cl.
*F01D 11/02* (2006.01)
*F16J 15/447* (2006.01)
*F16J 15/32* (2006.01)

(52) U.S. Cl. ................... 277/355; 277/421; 277/577

(58) Field of Classification Search ............... 277/355, 277/421, 577
See application file for complete search history.

(56) References Cited

U.S. PATENT DOCUMENTS

| 5,066,024 | A | * | 11/1991 | Reisinger et al. ........... 277/355 |
| 5,316,318 | A | * | 5/1994 | Veau .......................... 277/355 |
| 5,688,105 | A | * | 11/1997 | Hoffelner ................. 415/170.1 |
| 6,533,284 | B1 | * | 3/2003 | Aksit et al. ................. 277/355 |
| 6,695,314 | B1 | * | 2/2004 | Gail et al. ................... 277/355 |
| 2002/0020968 | A1 | * | 2/2002 | Gail et al. ................... 277/355 |
| 2002/0074729 | A1 | * | 6/2002 | Aksit et al. ................. 277/355 |
| 2003/0178778 | A1 | * | 9/2003 | Szymbor et al. ............ 277/355 |
| 2004/0256807 | A1 | * | 12/2004 | Bhate et al. ................. 277/355 |

FOREIGN PATENT DOCUMENTS

WO WO 01/48404 A1 7/2001

* cited by examiner

*Primary Examiner*—Patricia Engle
*Assistant Examiner*—Gilbert Lee
(74) *Attorney, Agent, or Firm*—Crowell & Moring LLP

(57) ABSTRACT

A brush seal assembly is provided for sealing components which move relative to one another. One of the components includes a recess or groove for accommodating a clamping sleeve which supports bristles. A support plate which is formed separately from the component and the clamping sleeve is pressed into the recess and abuts the recess wall surfaces and the clamping sleeve to hold the same in a predetermined working position.

4 Claims, 3 Drawing Sheets

BRUSH SEAL AND METHOD OF USING AND MAKING SAME

BACKGROUND AND SUMMARY OF THE INVENTION

The invention relates to a brush seal for sealing components which move relative to one another, having a sealing part, of which the bristles, which are held by a bristle backing with their free ends aligned with the sealing surface, are held in their predetermined working position by a support plate.

In known brush seals of this type, the sealing part which bears the bristles is clamped in a rotationally symmetrical bristle housing, which includes a cover plate and a support plate, in such a manner that the free ends of the bristles are directed radially inward onto the surface which is to be sealed off; cf. DE 100 18 273 A1.

Brush seals of this type, which are used to seal off a rotor with respect to a stator and the cover and support plates of which are welded together or connected to one another by other joining processes (e.g. flanging), and which, moreover, have to have positioning means on the bristle housing, so as to prevent incorrect installation and twisting of the brush seal, with assigned corresponding positioning means on a bearing surface of the component which bears the brush seal, are of complex structure and are only suitable for sealing off rotationally symmetrical bodies.

The invention is based on the object of widening the application area for brush seals of this type, simplifying their structure and developing them further in such a manner that they are suitable for sealing any desired sealing surfaces, i.e. including three-dimensionally curved sealing surfaces.

Working on the basis of a brush seal of the type described in the introduction, this object is achieved, according to the invention, by the fact that the support plate is designed as an independent clamping member for the sealing part, which is held by being pressed into a recess of a component which bears the brush seal, which recess includes a bearing surface for the support plate.

The design in accordance with the invention comprises only a sealing part and the support plate, which holds the bristles of the sealing part in their predetermined working position. The support plate is designed as a clamping part for the sealing part and can be pressed into recesses of any desired curvature, in the form of grooves in the component which bears the brush seal, so as to form a form and force locking securing means for the sealing part. There is therefore no need to construct the welded or flanged bristle housing which has hitherto been customary and to form special positioning means.

Should the sealing part need to be replaced, the support plate can be removed from the groove. To insert a new sealing part, a new support plate is required, since the previous support plate becomes unusable when it is removed from the groove.

This amazingly simple design of the parts of the brush seal, which are held by being pressed into place, results in simple and inexpensive assembly and dismantling even for complicated applications which encompass sealing surfaces of any desired curvature, which has not been possible with the brush seals which have been disclosed hitherto.

According to a preferred exemplary embodiment of the invention, the clamping member, which is designed as a support plate, has a knurling, which extends into the region of the recess and clamps the bristle backing of the sealing element in the recess, and also a bearing surface which corresponds with the bearing surface of the recess.

According to a further feature of the invention, the clamping member, which serves as a support plate, has a bearing surface, which corresponds with the bearing surface of the recess, and alternating wavy projections which extend into the region of the recess and on the one hand engage in an undercut surface of the recess and on the other hand bear against the bristle backing of the sealing member.

According to the invention, the clamping member, which serves as a support plate, may also have a collar, which partially surrounds the bristle backing of the sealing member, projects into the recess in the component which bears the brush seal and is assigned an undercut, located opposite the bearing surface, in the recess, while the bristle backing of the sealing element is at least partially surrounded by means of a flange lip of the collar.

Finally, according to a preferred embodiment of the invention, the collar of the support plate which is to be pressed into the recess is provided, at the base surface remote from the bristle ends, with a central bead, which can be permanently deformed by the sealing part being pressed into the recess, in such a manner that the collar comes to bear against the walls of the recess, which is preferably designed as a groove with a dovetail-like cross section.

The invention is described below on the basis of four exemplary embodiments illustrated in the drawing, in which, in detail:

DETAILED DESCRIPTION OF THE DRAWINGS

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Figure 1:
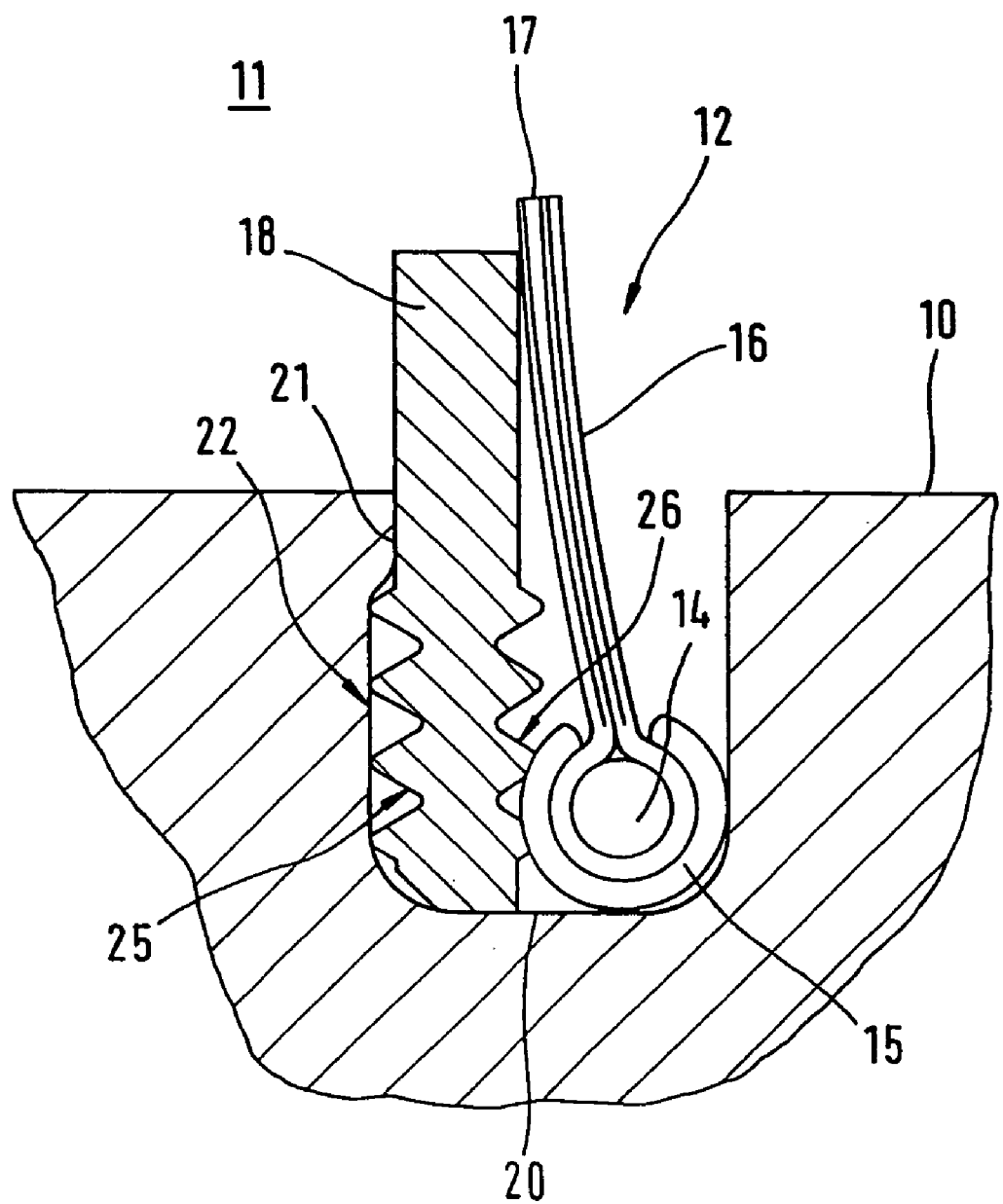
FIG. 1 shows a cross-sectional view through a first exemplary embodiment of a brush seal in accordance with the invention.

All that is shown in FIG. 1 of the components which move relative to one another and are to be sealed with respect to one another by means of the brush seal to be described below is part of the component 10 which accommodates the brush seal, denoted overall by reference numeral 11.

The brush seal comprises a sealing part 12, which is formed by bristles 16, which are wrapped around a core wire 14 and are held in an aligned position by a clamping sleeve 15 which supports the free bristle ends 17 and a support plate 18. All these components together are fixed in a groove 20 in the component 10 by being pressed in and are held in a form and force locking manner. The core wire 14 and the clamping sleeve 15 form what is known as the bristle backing of the sealing part 12. The sealing part may also be produced by clamping, welding, soldering or adhesive bonding as alternatives to the clamped version shown by reference numeral 12.

The groove 20, which has a bearing surface 21 and an undercut 22, has a profile which corresponds to the sealing surface (not shown) and determines a defined, unambiguous positioning of the sealing part with respect to the component to be sealed (not shown), which its bristle ends face.

To produce a form and force locking connection of sealing part and support plate in the groove, the support plate 18, which is supported against the bearing surface 21, has, at its end projecting into the groove 20, knurlings 25 and 26 which are oriented longitudinally on both sides, with the knurling 25 engaging into the undercut 22 of the groove 20 and, in the position illustrated, the knurling 26 clamping against the clamping sleeve 15 of the sealing part 12.

After the bristle backing of the sealing part and the support plate have been pressed into the groove—as illustrated in FIG. 1—the sealing part 12 is fixedly connected in a form and force locking manner to the component 10 and the free ends 17 of the bristles 16 are held supported in a predetermined position corresponding to the required sealing action. The groove 20 in the component 10 therefore forms a bristle housing.

Figure 2:
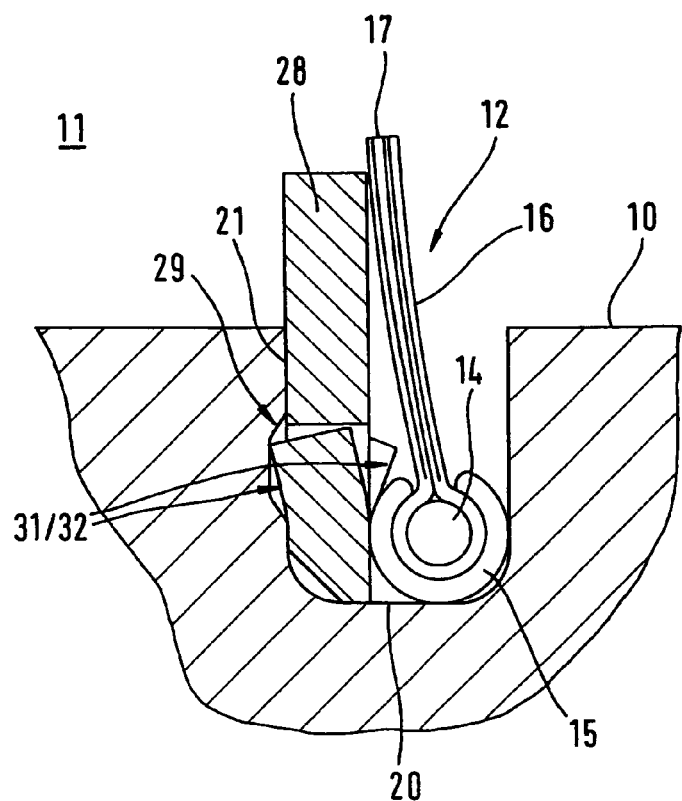
FIG. 2 shows a cross-sectional view through a second exemplary embodiment of a brush seal in accordance with the invention.

The further exemplary embodiment illustrated in FIG. 2 likewise shows only a part of the component 10 which includes the groove 20 and accommodates the brush seal, which is denoted overall by reference numeral 11. In this case too, the brush seal comprises the sealing part 12 and a support plate 28, which after they have been pressed into the groove 20 form a form and force locking, fixed connection to the component 10. For this purpose, that end of the support plate 28, supported against the bearing surface 21 of the groove 20, which projects into the groove 20 has alternating projections 31 and 32 which are bent off so as to form a wave-like structure and of which the projections 31 facing away from the sealing part engage in an undercut 29 of the groove 20, whereas the projections 32 engage on the clamping sleeve 15, i.e. on the bristle backing of the sealing part 12, so as to partially surround it.

Figure 3:
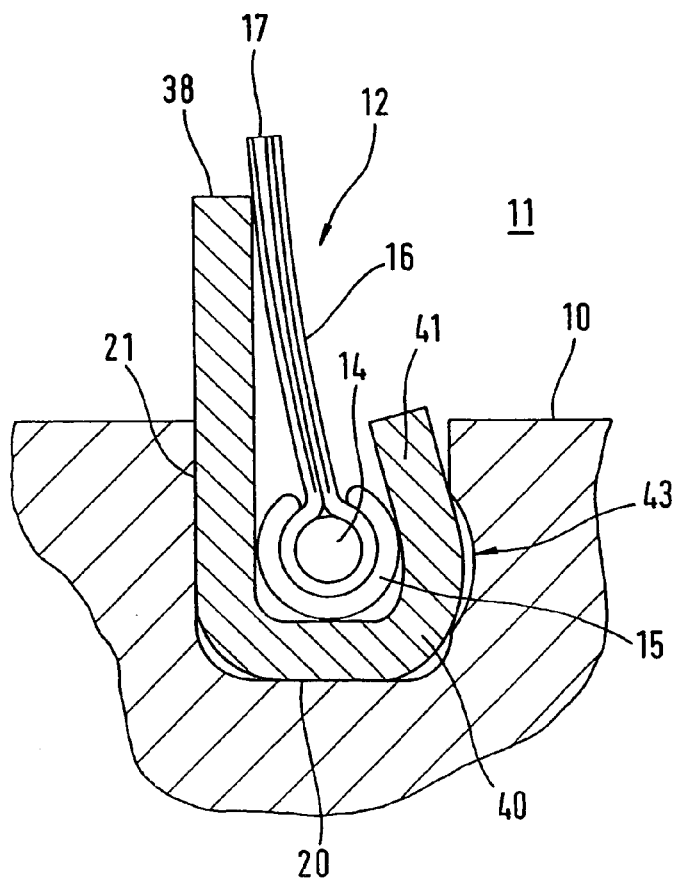
FIG. 3 shows a cross-sectional view through a third exemplary embodiment of a brush seal in accordance with the invention.

In the exemplary embodiment of a brush seal illustrated in FIG. 3, there is once again a sealing part 12, which is constructed in the same way as has been described for the exemplary embodiment illustrated in FIG. 1. In this case once again, therefore, the brush seal is held in a form and force locking manner in a groove 20 in a component 10 bearing the brush seal 11 by being pressed in. This purpose is once again served by a support plate 38, which supports the bristles 16, bears flat against the bearing surface 21 of the groove 20 and, in its region which projects into the groove 20, has a collar 40 which, by means of a flanged edge 41, partially surrounds the clamping sleeve 15 of the bristle backing. In the pressed-in position illustrated in FIG. 3, the collar 40 engages in an associated undercut 43 of the groove 20, so that in this embodiment too the sealing element is held in a form and force locking manner in the groove 20 by means of the support plate 38.

Figure 4:
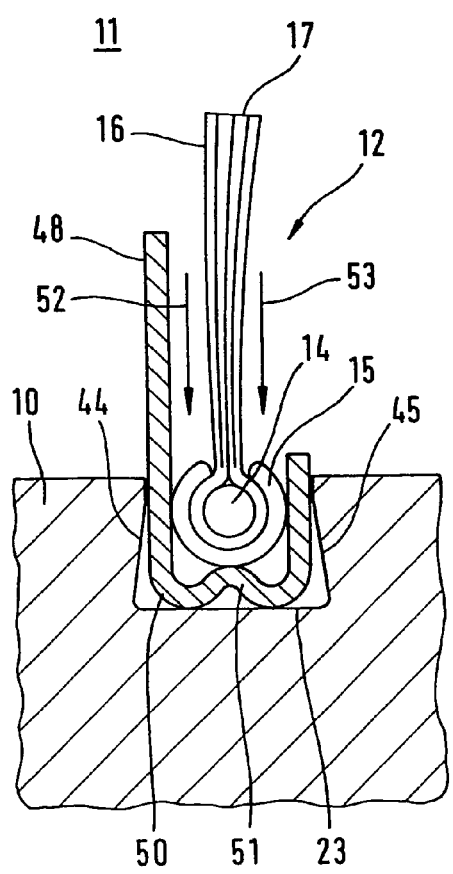
FIG. 4 shows a cross-sectional view through a fourth embodiment of a brush seal in accordance with the invention before it is pressed into the recess which holds it.
Figure 5:
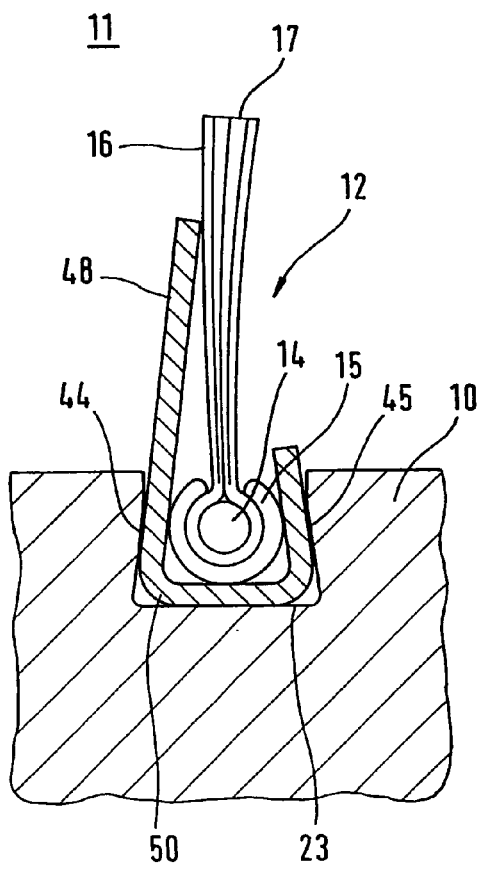
FIG. 5 shows the exemplary embodiment shown in FIG. 4 after it has been pressed into the recess.

The preferred exemplary embodiment shown in FIGS. 4 and 5 likewise has a sealing part 12, which is constructed in the same way as has been described for the exemplary embodiment illustrated in FIG. 1.

However, the recess in the component 10 which accommodates the sealing part is now designed in the form of a groove 23 with a dovetail-like cross section, i.e.—compared to the previous exemplary embodiments—has two opposite undercuts 44 and 45 which correspond to one another in mirror-image fashion. The support plate, which is denoted by reference numeral 48, likewise has a collar 50, which faces the groove 23, partially surrounds the bristle backing, i.e. core wire 14 and clamping sleeve 15, and the base surface of which, remote from the bristle end 17, bears a central bead 51; cf. FIG. 4. When the support plate and sealing part are pressed into the groove 23 in the direction indicated by arrows 52, 53, the bead 51 is permanently deformed in such a manner that the collar 50 comes to bear against the walls 44, 45 of the groove 23 so as to form the form and force locking connection, as shown in FIG. 5. The long limb of the support plate 48 adopts the position illustrated in FIG. 5, and the support plate thereby holds the bristles 16 in a predetermined position corresponding to the required sealing action. The sheet-metal thickness of the support plate 48 serving as a clamping member is preferably 0.5 mm.

A common feature of all the exemplary embodiments described above is that the sealing part is held, by means of a suitably shaped support plate, in the groove, which serves as a bristle housing and follows any desired three-dimensionally curved sealing surface, in the component bearing the brush seal in a form and force locking manner by being pressed in during assembly, and that the seal is only formed as a result of the sealing part and the support plate being inserted.

The invention claimed is:

1. A brush seal for sealing components which move relative to one another, having a sealing part, of which the bristles, which are held by a bristle backing with their free ends aligned with the sealing surface, are held in their predetermined working position by a support plate, wherein the support plate is designed as an independent clamping member for the sealing part, which support plate is held by being pressed into a recess, of a component which bears the brush seal, which recess includes a bearing surface for the support plate, wherein the support plate has a knurling which extends into a region of the recess and of which one knurling section which faces an undercut in the recess engages into the undercut, whereas an opposite knurling section bears against a bristle backing clamping sleeve of the sealing part so as to clamp it in a form and force locking manner in the recess.

2. A brush seal assembly comprising:
a component having a recess,
sealing bristles,
a clamping sleeve operatively clamping the sealing bristles, and support plate being configured to be pressable into the recess to clamp the clamping sleeve in the recess and thereby clamp the sealing bristles in a predetermined desired working position,
wherein the support plate has knurled surface sections which engage both of the clamping sleeve and a bearing surface of the recess when in an in-use position clamping the clamping sleeve.

3. A method of holding a brush seal clamping sleeve in a recess of a component, comprising:
placing the clamping seal in said recess and press fitting a support plate between bearing surface sections of the recess and the clamping sleeve to thereby clamp the clamping sleeve in the recess to the component,
wherein the support plate has knurled surface sections which engage both of the clamping sleeve and a bearing surface of the recess when in an in-use position clamping the clamping sleeve.

4. A method of making a brush seal assembly, comprising:
providing a component having a recess,
providing sealing bristles,
providing a clamping sleeve operatively clamping the sealing bristles, and
pressing a support plate which is separate from the component and clamping sleeve into the recess to clamp the clamping sleeve in the recess and thereby clamp the sealing bristles in a predetermined desired working position,
wherein the support plate has knurled surface section which engage both of the clamping sleeve and a bearing surface of the recess when in an in-use position clamping the clamping sleeve.

* * * * *